United States Patent
Acosta

(10) Patent No.: US 6,374,854 B1
(45) Date of Patent: Apr. 23, 2002

(54) DEVICE FOR PREVENTING PERMANENT ENTRAPMENT

(75) Inventor: Enrique Acosta, Miramar, FL (US)

(73) Assignee: Enrique Acosta, Miramar, FL (US)

( * ) Notice: Subject to any disclaimer, the term of this patent is extended or adjusted under 35 U.S.C. 154(b) by 0 days.

(21) Appl. No.: 09/628,777

(22) Filed: Jul. 29, 2000

(51) Int. Cl.[7] .............................. F16K 17/00; E04H 4/06
(52) U.S. Cl. ..................... 137/509; 137/517; 137/526; 137/907; 4/504
(58) Field of Search ............................. 4/504, 507, 509, 4/541.2; 137/509, 517, 526, 907; 210/136, 139

(56) References Cited

U.S. PATENT DOCUMENTS

| | | | | |
|---|---|---|---|---|
| 5,265,631 A | * | 11/1993 | Goettl ......................... 134/111 |
| 5,351,709 A | * | 10/1994 | Vos ............................. 137/907 |
| 5,682,624 A | * | 11/1997 | Ciochetti ..................... 137/907 |
| 5,822,807 A | * | 10/1998 | Gallagher et al. .......... 137/907 |
| 5,865,601 A | * | 2/1999 | Miller ........................... 417/2 |
| 6,098,648 A | * | 8/2000 | Bertoia ....................... 137/112 |
| 6,098,654 A | * | 8/2000 | Cohen et al. ............... 137/467 |

* cited by examiner

*Primary Examiner*—John Rivell
*Assistant Examiner*—Ramesh Krishnamurthy

(57) ABSTRACT

Device for preventing permanent entrapment that includes a hollow cylindrical body for installation in a suction line. A cylindrical chamber contained in body. A hollow entrappee member with grooves. Chamber contains entrappee member with sealing member, which moves through chamber. A guide cover member wherein a shaft has locking groove and move entrappee member. A spring acting against guide cover, connected to shaft by an adjustable collar. Require locking member to be reset from locking groove. Allowing entrappee member to move back to open position.

1 Claim, 1 Drawing Sheet

U.S. Patent
Apr. 23, 2002
US 6,374,854 B1
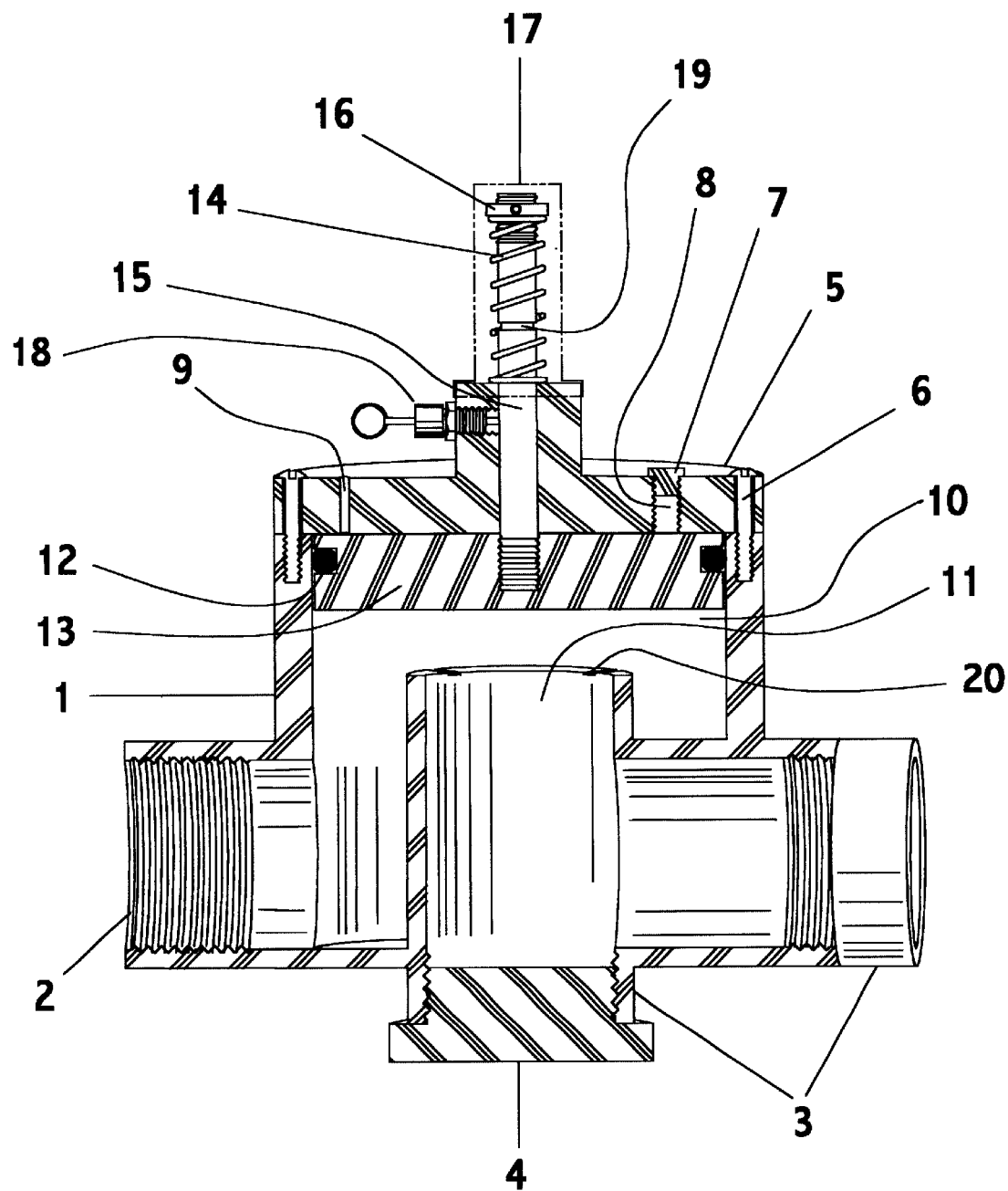

DEVICE FOR PREVENTING PERMANENT ENTRAPMENT

CROSS-REFERENCE TO RELATED APPLICATIONS

Not applicable.

STATEMENT REGARDING FEDERALLY SPONSORED RESEARCHED OR DEVELOPMENT

Not applicable.

REFERENCE TO A MICROFICHE APPENDIX

Not Applicable.

FIELD OF THE INVENTION

The present invention relates to a device for the prevention of permanent entrapment at the collector inlet of a suction line.

BACKGROUND OF THE INVENTION

For years and still today we have heard of or known of people that have died at the consequence of been trapped underwater from suction systems in pools and spas. People that have been present at the place and time of the accident have found themselves powerless for not knowing or worse not been able to have access to the water pumps shut-off switch. Just recently a young boy drowned in a pool because his friend was unsuccessful in opening the door to the pump room. Having to wait for the policemen to arrive to open the door and shut the pump off. This invention provides a device, which has a quick-acting response to an entrapment. This device can be conveniently installed in the suction system. Also does not require any external monitoring element or electrical activation to prevent a permanent entrapment.

SUMMARY OF THE INVENTION

The object of the present invention is to provide a device, which in the event of an entrapment at suction line inlet. Is to have the member inside the body to use the sudden rise in vacuum force and creates an automatic self-entrapment. Which drops the suction force at the inlet collector side.

This device comprises of:

A hollow cylindrical body with an internally threaded inlet and outlet port, for simple installation in a convenient point of the suction line between the collector inlet edge and pump suction chamber. Allowing free flow of the suction fluid through the body.

When an object is entrapped at inlet collector edge, critical flow variation occurs and a sudden rise in vacuum flow force takes place inside the system. Inside the chamber the vacuum force pulls the entrappee member 13 and acting against the spring force allowing entrappee member 13 to move axially through the chamber from open position towards the entrapper member 11. Creating an entrapment of the entrappee member 13, which drops the vacuum force acting at the edge of the suction line.

According to the invention the entrapper member 11 has grooves 20 around the edge and does not provide fluid-tight sealing engagement that allows some fluid to pass through to the pump suction chamber. Maintaining some level of liquid in the impeller and seal of the pump. At that point shutting off the pump is necessary to drop the force at the entrapper member 11. Allowing spring force 14 which is secured to shaft 15 by means of an adjustable collar and guide cover member 5 to return the entrappee member 13 to the open position. At that moment locking member 18 has to be released, with the use of an internal spring, locking detent element in the locking groove member 19. Release shaft member 15 by pulling detent element against spring pressure to return the entrappee member 13 to the open position.

To increase the effectiveness of this device, it has an optional threaded port 8 for the installation of a momentary on-off switch, which opens electric circuit to the pump. Which has to comply with local electrical code enforcement.

In relation to everything explained. I feel it is important to explain the advantages and alternatives this device possesses.

1. Low production cost.
2. Quick-Acting response.
3. Quick and simple installation on running systems.
4. Low and quick maintenance.
5. Self actuating without external assistance.
6. Introduction in the internal pump's body. Allowing for better effectiveness.
7. Permits installation in dual suction systems.
8. Optional electrical switch is a low cost momentary on-off switch, which has to comply with local electrical code enforcement.
9. Contributes to the attempted of preventing fatalities.
10. Allows being installed 90 degree or straight.
11. Does not contain any element that places anyone's lives in danger.
12. Can be installed in any position, in or out of the water.

BRIEF DESCRIPTION OF THE DRAWING

FIG. 1 is a schematic cross-sectional view of the device for preventing entrapment according to the present invention.

DETAILED DESCRIPTION OF THE INVENTION

This device comprises of:

A hollow cylindrical body 1 provided internally threaded ports. One for suction collector inlet side 2 and two outlet ports 3 to install pump suction line. One of these having plug 4 for change to the other port 3 in case of installation propose. On top of the body 1 cover 5 is closed tight and secured by means of fastening members 6 to the later chamber. On cover 5 a plug 7 closes the threaded access 8 for latter optional switch. On cover 5 a passage 9 for vent propose of rear of chamber 10 which has a cylindrical wall surface and comprises the hallow entrapper member 11 which has grooves 20 around the edge and does not provide a tight sealing engagement. A sealing member 12 is utilized between the latter entrappee member and the cylindrical wall surfaces of the chamber. Entrappee member 13, which moves axially through the chamber 10 from open position to closed position by sudden rise in suction force. Entrappee member 13 moves back to open position by means of spring force 14 when suction force drops. Shaft member 15 which connects to the rear of entrappee member 13 by threaded means. Having, at the rear, spring 14 and adjustable collar 16 for entrapment response adjustment. Dust cover 17 protects members 14,15, and 16. Locking member 18 locks against locking groove 19 by means of an internal spring pushing a detent element. Therein preventing member 13 from returning.

I claim:

1. Device for preventing permanent entrapment that includes, a hollow cylindrical body with internally threaded inlet and outlet port for installation in a suction line, a cylindrical wall chamber contained in said body, a hollow cylindrical entrapper member which communicates with inlet and outlet ports when open, with grooves on said member, contained in said chamber, said chamber contains entrappee member with complementary sealing member which moves axially through said chamber, a guide cover member closed tight and secured by fastening means to said chamber, a shaft member which has a locking groove and moves through said guide cover member, connected to said entrappee member, a spring means connected to said shaft, acting against said guide cover, a locking member connected by fastening means to said guide cover, said locking member, locking said entrappee member by means of said locking groove.

* * * * *